March 1, 1955 R. P. SCHERER ET AL 2,703,047
MACHINE FOR BRANDING CAPSULES
Filed July 12, 1952
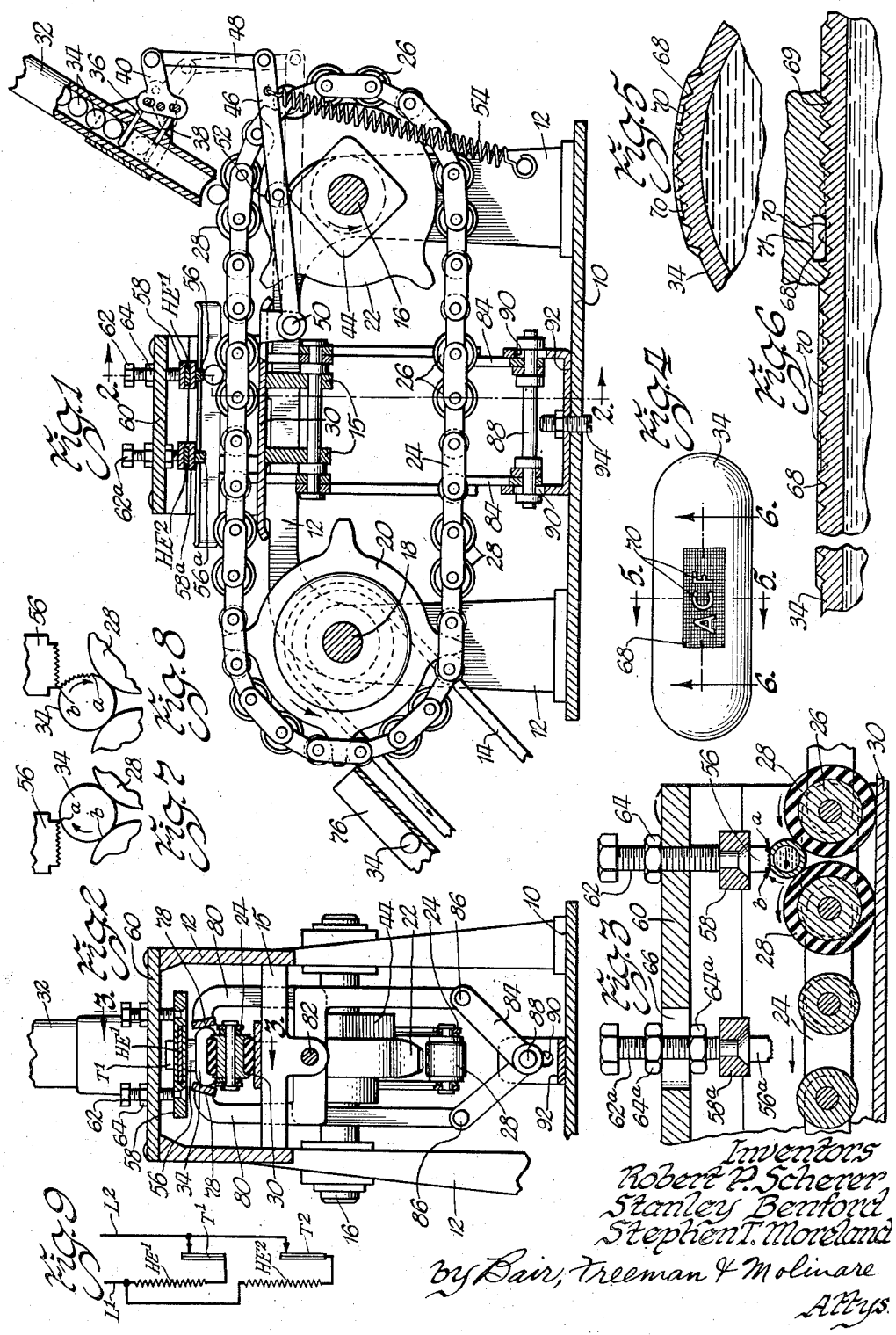
Inventors
Robert P. Scherer
Stanley Benford
Stephen T. Moreland
by Bair, Freeman & Molinare
Attys.

United States Patent Office 2,703,047
Patented Mar. 1, 1955

2,703,047

MACHINE FOR BRANDING CAPSULES

Robert Pauli Scherer, Stanley Benford, and Stephen T. Moreland, Detroit, Mich., assignors to R. P. Scherer Corporation, Detroit, Mich., a corporation of Michigan Application July 12, 1952, Serial No. 298,582

17 Claims. (Cl. 101—8)

This invention relates to a machine for branding a filled gelatine capsule or the like by the application of a die or stamp thereagainst. The filled gelatine capsules herein referred to are those conventional in the pharmaceutical art. As is well known, such capsules may be prepared by any one of several conventional methods, some of which are disclosed in our copending application, Serial No. 285,984, filed May 3, 1952.

In preparing filled gelatine capsules, a plastic gelatine mass may be formed into a capsule as described in the Scherer Patent No. 1,970,396. When freshly made, the wall or shell of the capsule contains the same amount of water as the plastic gelatine mass from which the capsule was made. For this reason the capsules are relatively weak when first made and to make them stronger they are dehydrated as by exposure to dry, warm air or to acetone or some other agent capable of extracting water from the capsule wall or shell. After such dehydration, which results in a reduction of the water content to between 10% and 15% of the original, the manufacturing process is considered complete and the capsules are in final form and ready for branding. It should be noted that the capsules are filled with medicament or other liquid when formed or made. More particularly the capsule walls or shells are formed around a small quantity of liquid which makes up the liquid content of the capsule.

These capsules are generally circular in transverse cross-section and may have rounded or globular shape or may be more or less elongated or tubular having rounded ends. The machine disclosed in the present application is particularly adapted for branding the elongated or tubular types of capsules.

The wall or shell thickness of conventional gelatine capsules ranges typically between .015" to .030" and may average about .0225". In view of the thinness of the walls or shells of these capsules, it is impractical to form indented or recessed letters or line figures in the surface thereof without giving special consideration to factors for which our machine is designed to compensate.

The gelatine mass making up the wall or shell of the gelatine capsule can be made plastic by raising its temperature for a given gelatine mass a minimum temperature at which the gelatine mass is initially rendered capable of plastic deformation. As the temperature of a capsule shell or wall is raised, however, the temperature at which the gelatine mass is rendered fluid or at least offers very little resistance to deformation exceeds the above noted minimum temperature by only a very limited range.

It is practically impossible to raise a capsule as a whole to a temperature within the indicated range and then to stamp the desired letters or line figures into the capsule surface in relief for when the whole capsule has been raised to a temperature within the indicated range the whole capsule is very weak or flaccid and therefore offers no resistance to the compressor force exerted against the capsule on such stamping. In other words, the capsule would then be deformed or would lose its original shape as by being flattened out. In our machine, therefore, we apply a heated stamp or die against this surface and this die is forcefully applied by a supporting arrangement for the capsule which rolls it along under the die and, since the die only is heated, the plasticizing of the capsule shell or wall (by heat transfer from the stamp or die) is to only a surface layer of the wall or shell of the capsule and, therefore, does not perforate the wall or shell and form an aperture therein which would cause the capsule to leak and therefore become useless. Application of the hot stamp or die must be continued at least for a definite period of time in order to render the surface layer sufficiently plastic, and the rate of travel of the capsules through the machine may be regulated for this purpose.

One object of the machine is to provide mechanism for branding gelatine capsules by forming letters or other line figures in relief on the surface thereof without deforming the whole capsule and without causing perforation of the capsule wall or shell.

Another object is to provide a machine of the character herein disclosed which provides a pair of cylinders to support the capsule and an arrangement to rotate the cylinders and thereby the capsule in the trough formed between the two cylinders, causing the capsule to travel linearly and at the same time roll under the heated die which is at such position in relation to the cylindrical rollers and so related to the size of the capsules being branded that the desired pressure is had thereon for properly branding them as they roll under the die.

Still another object of our invention is to provide a machine which automatically performs the branding operation without the necessity of manually handling the capsules or performing any manual operations in connection with the branding thereof.

More specifically it is an object of our invention to provide a conveyor for capsules which is designed to carry them under branding dies or stamps in such manner as to cause them to roll along the branding surfaces thereof and be heated thereby (the dies being heated for this purpose) so as to have their surfaces sufficiently softened to receive the imprint of the die or stamp thus giving to the capsules a distinctive appearance for designating manufacturer's origin, for indicating the contents of the capsule, or for any other purpose for which branding is desirable.

A further object is to provide pairs of adjacent side-by-side rollers for supporting and rotating the capsules as they are carried along under the branding dies.

Still a further object is to provide means for automatically delivering the capsules one at a time to the pairs of rollers of the conveyor in such manner that they are deposited in the troughs provided by the successive pairs of rollers.

Still a further object is to provide means engaging the ends of the capsules to retain them against the rollers for proper rotation thereby and for centering them with respect to the rollers so that the branding impressions may be applied at a definite position in relation to the length of the capsule.

An additional object is to provide a machine of this character which may have a second die for branding the diametrically opposite side of the capsule after it has been branded on one side.

A further additional object is to provide a machine for branding capsules which adequately supports the capsules in a predetermined position with respect to the die as they roll beneath it and which provide in effect a trough having moving sides in which the capsule is cradled and rotated properly with respect to the die during the branding operation.

With these and other objects in view, our invention consists in the construction, arrangement and combination of the various parts of our machine for branding gelatine capsules, whereby the objects contemplated are attained, as hereinafter more fully set forth, pointed out in our claims and illustrated in the accompanying drawings, wherein:

Figure 1 is a side elevation of a branding machine embodying our present invention, one of the side frames being removed and portions of the machine being shown in section to expose details thereof.

Figure 2 is a vertical sectional view on the line 2—2 of Figure 1.

Figure 3 is an enlarged sectional view on the line 3—3 of Figure 2 to illustrate the branding operation.

Figure 4 is an enlarged elevational view of a capsule as branded by our machine as illustrated in Figure 3.

Figure 5 is a similarly enlarged fragmentary cross-sectional view taken along the line 5—5 of Figure 4.

Figure 6 is a greatly enlarged fragmentary cross-sectional view taken along the line 6—6 of Figure 4.

Figure 7 is a diagrammatic view showing the start of a branding operation which is half-way completed in Figure 3.

Figure 8 is a similar diagrammatic view showing the completion of the branding operation; and Figure 9 is an electro-diagrammatic view of thermostatically controlled heating elements for the branding dies or stamps.

On the accompanying drawings we have used the reference numeral 10 to indicate a base plate and 12 a side frame. Two of the side frames 12 are provided as shown in Figure 2 and these are connected together by suitable cross members 15. The side frames 12 are provided with suitable bearings for a drive shaft 18 and an idler shaft 16 on which are mounted sprockets 20 and 22 respectively. Suitable drive means (not shown) is provided for the shaft 18 and may include a belt or chain 14.

We provide a conveyor chain 24 passing around the sprockets 20 and 22 and carrying pairs of rollers 26 arranged side-by-side. These rollers are preferably provided with friction elements or "tires" 28 adapted to contact with a stationary track 30 for rotating the rollers as they travel across the track upon movement of the conveyor chain 24 as will hereinafter appear.

A delivery chute 32 is provided for the capsules shown at 34 and an escapement mechanism consisting of an upper plate 36 and a lower plate 38 slidably mounted and adapted to alternately enter the delivery chute 32 as shown by dotted and solid lines in Figure 1 is provided. These blades are operatively connected with a rock lever 40 which is oscillated in timed relation to the sprocket 22 by a cam 44, a lever 46 and a link 48. The lever is pivoted to the frame at 50 and carries a roller 52 biased to engage the cam by a spring 54.

For branding the capsules 34, we provide a die or stamp 56 carried by a supporting bar 58 which in turn is supported from a stationary plate 60 having its ends attached to the side frames 12. A pair of adjusting screws 62 have their lower ends rotatable in the bar 58, are threaded in the plate 60, and are provided with lock nuts 64 to retain the adjustment.

The die or stamp 56 is heated by a heating element HE[1], under control of a thermostat T[1], as shown in Figures 1 and 2. The electric circuit therefor is shown in Figure 9, the line wires for supplying current thereto being L[1] and L[2]. The thermostat maintains the heating element at a suitable and substantially constant operating temperature.

In the event that it is desirable to brand the opposite side of the capsule, a second die 56a may be provided and supported by a bar 58a which in turn is supported on the plate 60 by a pair of adjusting screws 62a. These screws are mounted in slots 66 of the plate 60 so that the die 56a may be adjusted toward the die 56 to accommodate smaller diameter capsules or adjusted away from it to accommodate larger diameter capsules, the adjustment for each screw 62a being retained by a pair of lock nuts 64a. Both stamps 56 and 56a may also be adjusted vertically by means of the two pairs of screws 62a in an obvious manner to accommodate different diameters of the capsules and permit the desired adjustment of the height of the stamping surface to provide the proper degree of branding pressure during the stamping operation.

A suitable discharge chute 76 is provided to receive the capsules 34 after they are branded and deposit them in a suitable container for removal to other points of operation or for packaging.

We provide means to center the capsules 34 with respect to the rollers 26 and to retain the capsules down against the rollers during the branding operation which consists of opposed bars 78 extending along the upper stretch of the conveyor and adapted to contact the ends of the capsules as shown in Figure 2. These bars are slightly inclined from the vertical so that when biased toward each other they tend to have a slight downward forcing action on the capsule ends to hold them against the tires 28 of the rollers 26, Levers 80 are provided to support the bar 78 and these levers are pivoted on a rod 82 mounted in the cross bars 15. Each lever 80 is of Z shape and links 84 are pivoted at 86 to their lower ends. A rod 88 is in turn pivoted to the links and serves as a weight to bias the upper ends of the levers 80 toward each other. The rod 88 is movable in vertical slots 90 of a bracket 92 so that the link arrangement insures simultaneous and equal movement of the centering bars 78 toward each other under the bias of the rod 88 or away from each other as a result of the spreading action imparted to the bars 78 by a capsule 34 when located and traveling between them. A stop screw 94 is shown in the base plate 10 to limit the downward movement of the rod 88 and thereby the distance between the centering bars 78 to accommodate the length of capsule being branded.

The branding surface (lower surface) of the die 56 or 56a, as the case may be, is toothed in the manner of a file or rasp, letters or other lined figures to be formed on the capsule surface being provided on this terminal die surface in deep intaglio and being spaced from the edges of the terminal surface, as shown particularly for the die 56 in Figure 7. The teeth may take the form of corrugations, elongate ridges alternating with grooves being formed in the die surface by milling or if desired each of the above noted elongate ridges may be divided into a series of line tooth-like projections as by milling the die surface along lines extending transversely with respect to the above noted ridges whereby a grid pattern is formed on the die surface and is subsequently transferred to the capsule surface as shown at 68 in Figure 4. On the other hand, the teeth may take the form of ridges extending as concentric circles or as a spiral over the die surface.

When a hot die or stamp as described in the preceding paragraph is forcefully applied against the surface of a gelatine capsule, the surface layer of the capsule wall or shell is rapidly heated to within a desired temperature range (100° F. to 300° F.) and the serrations of the terminal die or stamp area (indicated at 69 in Figure 6) enter readily into the capsule wall or shell as shown so that after such entrance heating of the capsule wall or shell portion opposed to the die or stamp effectively and rapidly takes place over the area of actual contact (as between the die or stamp and the opposed capsule wall or shell portion) which is greater than the cross sectional area of the die or stamp and also is greater than the thereto opposed capsule wall or shell area. This results in an efficient and rapid heat transfer to only the outermost layer of gelatine mass in the capsule wall or shell that is initially contacted by the terminal die surface.

Heat plasticized gelatine mass fills the groove between the teeth on the die surface after such initial contact so that thereafter any further heat transfer to deeper layers in the capsule wall or shell must take place over an area equal only to the cross section of the die and through this heat plasticized gelatine mass which does not conduct heat very rapidly if the temperature of the die or stamp is maintained at a level within the above noted temperature range, proper branding can be effected providing, of course, the speed of travel of the conveyor is proper. The capsule surface areas 70 opposed to the letters or other configurations 71 formed in deep intaglio on the terminal die or stamp area are not contacted at all by the die or stamp and therefore are not rendered plastic. The depressions in the branding surface of the die may be approximately .005" deep to form the grid pattern 68. Accordingly, a capsule branded with letters or other line figures in relief, in accordance with the present invention, will present a circumscribed area or shield having indentations generally slightly depressed with respect to the rest of the capsule surface and the outline of the shield corresponds to the outline of the terminal die or stamp surface. The shield area is toothed, the toothed pattern corresponding to the grooves between the teeth on the terminal die or stamp surfaces. The letters or other line figures 70 rise higher than the tops of the indentations in the corrugated or gridded or otherwise toothed shield surface of the capsule to the level illustrated in Figures 5 and 6, the heated gelatin material being displaced by pressure to produce this degree of elevation of the letters above the general surface of the grid.

The terminal die surface, as shown in Figure 7, is generally plane and may be scored longitudinally and transversely to form the grid pattern in the capsule indicated at 68. Then by tooling intaglio letters 71 in the die surface, the letters 70 in relief on the capsule are produced during the branding operation. Thus projecting teeth are formed by the intersecting grooves to make up the complete shield appearing in the final branding of the capsule.

*Practical operation*

In the operation of our branding machine, capsules may be fed from a suitable hopper into the delivery tube 32 and are released therefrom one at a time by the escapement blades 36 and 38 as they reciprocate alternately in opposite directions as shown by solid lines and dotted lines in Figure 1, the reciprocations, of course, being the result of rotation of the idler shaft 16 and its cam 44. The timing is such that a capsule 34 is released so as to roll down the portion of the chute 32 below the escapement mechanism and reach a position resting on the tires 28 of a pair of the rollers 26 each time a pair reaches a position of registry with the discharge end of the chute.

Thereupon the capsule 34 is carried by the pair of rollers until the tires 28 engage the track 30, whereupon the rollers start to roll counter-clockwise, inasmuch as the upper stretch of the chain is traveling from right to left in Figures 1 and 3, and this rotates the capsules clockwise also as shown by arrows in Figure 3. The speed of the upper surface of the capsule is such that substantially a rolling contact is had with the terminal end of the die 56 and this avoids any sliding action of the capsule surface relative to the branding surface that might tend to distort the brand or shield design on the capsule as the capsule is moved relative to the die. By reference to Figures 7, 3 and 8, in the order named, it will be obvious that the capsule 34 has one point indicated *a* on its periphery which initially contacts the edge of the die as shown (Figure 7) and as the tires 28 continue to roll along the track 30 as to the position shown in Figure 3, the point *a* remains substantially at the beginning of the die area; whereas the point *b* moves up to a position substantially at the termination thereof. Then as the tires 28 continue to roll along the track 30, the capsule rolls out from under the die as in Figure 8, and the rolling action and the time that it takes to accomplish the same results in the branding surface of the die properly impressing the design on the capsule such as shown at 68—70 in Figure 4.

If it is desirable to brand the diametrically opposite side of the capsule, it may be rotated, for instance, one and one-half turns to come into contact with the second die 56a and this die, being heated by a heating element HE² under control of a thermostat T² in the same manner as the die 56, will impress a second brand on the capsule, the position of which may be adjusted relative to the first in an obvious manner by adjusting the screws 62a along the slots 66. Also, the dies may be adjusted as to elevation for the desired pressure against the capsule while the capsule is supported in the trough formed by the two adjacent side-by-side rollers 26 and their tires 28.

We have found that the total time of forceful application of the die against the capsule may range from .01 to .5 second, the preferred time being about .05 second, and that this is suitable when the die temperature is raised to a range between 100° to 300° F. The higher portion of this temperature range is preferred for capsules made from gelatin masses containing relatively small amounts of plasticizer, while the lower portion of this range is preferred for capsules made with gelatine masses containing relatively large amounts of plasticizers. At die temperatures below 100° F. or at impression times less than .01 second, the gelatine mass is not sufficiently plastic to permit branding while at temperatures in excess of 300° F. or at impression times longer than .5 second, the letters are formed with such ragged outlines as not to be readily readable.

A branded capsule is illustrated in Figures 4, 5 and 6. As there shown, the capsule has formed on its surface (over the area contacted by the die 56) a shield having an outline conforming with the edge of the terminal surface of the die. The surface of the shield is gridded as at 68 and has the letters 70 at the original surface level of the capsule inside the margin of the shield. The deepest points of the grid 68 may be from about .001" to about .002" below the original surface level of the capsule area opposed to the die and their tops may extend about an equal distance above this level so that the tops of the letters 70 are intermediate these two levels and coincident with the surrounding unstamped capsule surfaces as illustrated particularly in Figures 5 and 6.

From the preceding disclosure, it is apparent that the toothed surface of the die 56 initially contacts the surface of the capsule, and during the rolling of the capsule under the die this contact is progressive at a plurality of spaced limited areas defined by the edges of the points of the teeth on the die surface. As the capsule is forced against the die surface by the tires 28 which are supported and are moving along under the die, increments of area of the capsule expand until they flow over the whole capsule area opposed to the die with the exception of that portion of the capsule area opposed to the deep intaglio letters 70 formed in the die surface.

This expansion of the contact areas does not take place in the plane of initial contact but outside this plane at progressively increased distances away from the areas of initial contact in a radially outward direction from the point of contact. In other words, the expanding contact areas flow away from the initial contact areas so that adjacent contact areas, when ultimately merging, extend angularly with respect to each other. The heat-plasticized gelatine mass exposed to compressive force in front of these sloping and intersecting die surfaces readily flows radially of the capsule into the spaces defined by the indentations between the teeth formed in the die surface.

While one design of impression is illustrated, it is obvious that the die surfaces may be modified in many respects to produce proper branding with many other designs of surfaces and lettering etc.

After the capsule has been branded, it leaves the branding mechanism and soon thereafter the tires 28 disengage the track 30 so that the capsules are free to drop off the rollers 26 when they reach a position adjacent the discharge chute 76. The branding operations are performed automatically and once the machine is set up for operating on a certain size of capsule, the capsules may be run through the machine in a minimum of time. The mechanism for branding them is comparatively simple yet effectively performs the branding operation so that the finished product may appear as in Figure 4 either on one surface only or on diametrically opposite surfaces as desired. For thus purpose, a single long die with two engravings on its face spaced properly to produce brands on diametrically opposite sides of the capsule may be substituted for the two dies 56 and 56a. Also a single long die may be used to brand the capsule around its entire circumference if desired.

Different designs of branding may be used for content identification purposes or for identifying manufacturer's product or the origin thereof, and it is obvious that the design may be modified in shape and size within considerable limits without departing from the essence of the invention. The mechanism is comparatively simple and capable of relatively great speed of operation so as to brand capsules or other cylindrical objects entirely automatically and in a minimum of time.

Some changes may be made in the construction and arrangement of the parts of our machine for branding gelatine capsules without departing from the real spirit and purpose of our invention, and it is our intention to cover by our claims any modified forms of structure or use of mechanical equivalents which may be reasonably included within their scope.

We claim as our invention:

1. In a branding machine for capsules and the like, a conveyor for the capsules, a branding die above said conveyor and having a lower elongated heated branding surface, spaced pairs of rollers carried by said conveyor wherein the rollers are adjacent and parallel to each other, each pair being adapted to have a capsule rest therebetween, and a track for said rollers to travel for imparting rotation thereto and thereby to the capsule carried thereby with the capsule rotating in an opposite direction relative to the rollers that rotate it whereby its upper surface may have rolling contact with said elongated branding surface.

2. In a branding machine for cylindrical capsules, a conveyor for the capsules, a branding element adjacent said conveyor having a heated branding surface, a pair of side-by-side rollers carried by said conveyor and adapted to have the capsule rest in the trough formed between them, and a track for said rollers to travel for imparting rotation thereto and thereby to the capsule carried thereby, said die being positioned in respect to the capsule carried by the rollers so as to press thereagainst and have rolling contact therewith as the capsule is carried by the rollers under the die.

3. In a branding machine, a conveyor for cylindrical capsules, a branding element having a plane surface, said branding element being heated for impressing the design of the branding surface in the surface of the capsule, spaced pairs of rollers carried by said conveyor, each pair being adapted to have a capsule rest thereon, a track for said rollers to travel for imparting rotation thereto and thereby to the capsules carried thereby, said track being substantially parallel to said die surface and so spaced in relation thereto as to cooperate with said conveyor to carry said capsules in rolling contact and under pressure against the die surface thereof.

4. In a branding machine for cylindrical capsules, a conveyor for the capsules, a branding element adjacent said conveyor and having a heated branding surface, spaced pairs of rollers carried by said conveyor, each pair being adapted to have a capsule rest thereon, and a track for said rollers to travel for imparting rotation theerto and thereby to the capsule carried thereby with the capsule rotating in an opposite direction relative to the rollers that rotate it whereby its upper surface may have rolling contact with said branding surface of said branding element.

5. In a branding machine of the character disclosed, a conveyor for cylindrical capsules, a branding element having an elongated branding surface, spaced pairs of rollers carried by said conveyor wherein the rollers are adjacent and parallel to each other, each pair being adapted to have a capsule rest thereon, and a track for said rollers to travel for imparting rotation thereto and thereby to the capsule carried thereby, said track being substantially parallel to said branding surface and spaced therefrom a distance which provides contact under pressure of said capsule supported on said pair of rollers with said branding surface.

6. In a branding machine of the character disclosed, a conveyor for capsules, a branding element having a heated branding surface, spaced pairs of rollers carried by said conveyor wherein the rollers are adjacent and parallel to each other, each pair being adapted to have a capsule rest thereon, a track for said rollers to travel for imparting rotation thereto and thereby to the capsule carried thereby, said track being substantially parallel to said branding surface and spaced therefrom a distance which provides pressure contact of said capsules supported on said pairs of rollers with said branding surface, and means engaging the ends of the capsules on said conveyor and rollers as they travel said track to center them on the rollers and retain them seated thereagainst, said means comprising bars extending along the conveyor, means to bias said bars toward each other, and link connections to insure equal movement of the bars toward each other under the action of said biasing means and away from each other under the spreading action of capsules between them.

7. In a branding machine for capsules, a conveyor for the capsules, a branding element having a surface formed with configurations, said branding element being heated for contacting the capsule area to be heated and plastically deformed, said surface being recessed in conformance with the brand to be applied to the capsule, spaced pairs of rollers carried by said conveyor, each pair being adapted to have a capsule rest thereon in the trough formed between the rollers, a track for said rollers to travel for imparting rotation thereto and thereby to the capsule carried thereby to afford rolling contact between it and the branding element, and means engaging the ends of the capsules on said conveyor and rollers as they travel said track to center them on the rollers and to retain them against said rollers.

8. In a branding machine, a conveyor for capsules, a branding element above said conveyor and having a plane branding surface provided with irregularities to form a design on a capsule when said branding element is heated and placed in pressure contact therewith, spaced pairs of rollers carried by said conveyor for conveying the capsules past said branding element and providing such pressure, each pair being adapted to have a capsule rest between, a track below said rollers for them to travel for imparting rotation thereto with the capsules in rolling contact with said branding surface, and means engaging the ends of the capsules on said conveyor and rollers as they travel said track to center them on the rollers and retain them seated thereagainst and in alignment with said branding surface, said means comprising bars extending along the conveyor, pivot means for supporting said bars, and means to bias said bars toward each other equally.

9. In a branding machine, a conveyor for capsules, a branding element above said conveyor and having a branding surface, means for heating said surface, spaced pairs of rollers carried by said conveyor, each pair being adapted to form a trough between them in which a capsule may rest, a track for said rollers to travel for imparting rotation thereto with the capsules in rolling contact with said branding element, said track being substantially parallel thereto to provide substantially equal pressure of said branding element with respect to said capsule as said rollers travel said track, and means engaging the ends of the capsules on the ends of said conveyors and rollers as they travel said track to center them on the rollers and retain them seated thereagainst and in alignment with said branding surface.

10. In a branding machine, a conveyor for capsules, a branding element above said conveyor and having a branding surface, means for heating said surface, spaced pairs of rollers carried by said conveyor, each pair being adapted to form a trough between them in which a capsule may rest, a track for said rollers to travel for imparting rotation thereto with the capsules in rolling contact with said branding element, said track being substantially parallel thereto to provide substantially equal pressure of said branding element with respect to said capsule as said rollers travel said track, and means engaging the ends of the capsules on the ends of said conveyors and rollers as they travel said track to center them on the rollers and retain them seated thereagainst and in alignment with said branding surface, said means comprising bars extending along the conveyor, pivot means for supporting said bars, means to bias said bars toward each other, and means to insure equal movement of the bars toward each other under the action of said biasing means and away from each other under the spreading action of capsules on said conveyor rollers between the bars.

11. In a branding machine, a conveyor for cylindrical capsules, a branding element above said conveyor having a heated die surface, spaced pairs of rollers carried by said conveyor wherein the rollers are adjacent and parallel to each other, each pair being adapted to have a capsule rest in the trough formed between them, a track for said rollers to travel for imparting rotation thereto and thereby to the capsule carried thereby with the capsule in impression receiving relation with said heated die surface.

12. In a branding machine, a conveyor for cylindrical capsules, a branding element above said conveyor having a heated die surface, spaced pairs of rollers carried by said conveyor wherein the rollers are adjacent and parallel to each other, each pair being adapted to have a capsule rest in the trough formed between them a track for said rollers to travel for imparting rotation thereto and thereby to the capsule carried thereby, said heated die surface being spaced in relation to said track to permit capsules of a predetermined size to be supported on said rollers and to be deformed as they pass under said branding surface sufficiently to impress the design of the branding surface into the surface of the capsule without perforating the capsule.

13. In a branding machine, a conveyor for cylindrical capsules, a branding element above said conveyor having a heated die surface, spaced pairs of rollers carried by said conveyor wherein the rollers are adjacent and parallel to each other, each pair being adapted to have a capsule rest in the trough formed between them a track for said rollers to travel for imparting rotation thereto and thereby to the capsule carried thereby, said die being positioned in respect to the capsule carried by the rollers so as to press thereagainst and have rolling contact therewith as the capsule is carried by the rollers under the die, and a second branding surface for the opposite side of the capsule and spaced from the first branding surface to position a second impression on the capsule in a predetermined relation to the first impression thereon.

14. In a branding machine for cylindrical capsules, a conveyor for the capsules, a branding element above said conveyor and having a heated branding surface at its lower terminal end, spaced pairs of rollers carried by said conveyor wherein the rollers are adjacent and parallel to each other, a track for said rollers to travel for imparting rotation thereto and thereby to the capsules carried thereby with the capsules rotating in an opposite direction relative to the rollers that rotate them whereby their upper surfaces have rolling contact with said branding surface, and means engaging the ends of the capsules on said conveyor and rollers as they travel said track to center them on the rollers and retain them seated thereagainst, said means comprising elongated bars extending along the conveyor, pivot means for supporting said bars and permitting them to swing toward each other, means to bias said bars toward each other, and link connections to insure equal movement of the bars toward each other under the action of said biasing means and away from each other under the spreading action of capsules on said conveyor rollers between them.

15. In a branding machine for capsules, a conveyor for the capsules, a branding element adjacent said conveyor and having a surface opposing said conveyor which is configured for branding, said surface being heated, spaced pairs of rollers carried by said conveyor, each pair being adapted to have a capsule rest therebetween, a track for said rollers to travel for imparting rotation thereto with the capsules in rolling contact with said heated surface and applying a compressive force thereagainst, whereby said compressive force may be applied over all of said heated area corresponding to a line figure to cause the heat plasticized gelatin mass in only a surface layer of said heated area to be displaced to define said line figure on said capsule surface with the line figure in relief thereon.

16. In a branding machine, a conveyor for capsules, a branding element having a branding surface, spaced pairs of rollers carried by said conveyor wherein the rollers are adjacent and parallel to each other to form a trough, each pair being adapted to have a capsule rest thereon in said trough, and means engaging the ends of the capsules on said conveyor and rollers to center them on the rollers and retain them seated thereagainst, said means comprising bars extending along the conveyor, means to bias said bars toward each other, and link connections to insure equal movement of the bars toward each other under the action of said biasing means and away from each other under the spreading action of capsules between them.

17. In a branding machine, a conveyor for capsules, a branding element spaced from said conveyor and having a plane branding surface provided with irregularities to form a design on a capsule when said branding element is heated and placed in pressure contact therewith, spaced pairs of rollers carried by said conveyor for conveying the capsules past said branding element and providing such pressure, a track for said rollers to travel for imparting rotation thereto with the capsules in rolling contact with said branding element, and means engaging the ends of the capsules on said conveyor and rollers as they travel said track to center them on the rollers and retain them seated thereagainst and in alignment with said branding surface.

References Cited in the file of this patent

UNITED STATES PATENTS

| | | |
|---|---|---|
| 1,656,494 | Nutt et al. | Jan. 17, 1928 |
| 2,189,637 | Litchfield | Feb. 6, 1940 |
| 2,268,797 | Breshear, Jr. | Jan. 6, 1942 |
| 2,341,409 | McDonell | Feb. 8, 1944 |
| 2,424,006 | Verrinder | July 15, 1947 |